United States Patent [19]
Bjerga

[11] 3,986,539
[45] Oct. 19, 1976

[54] AUTOMATIC BATTERY FILLER

[76] Inventor: Børge Bjerga, 4152 Osthusvik, Norway

[22] Filed: Sept. 12, 1974

[21] Appl. No.: 505,831

[30] Foreign Application Priority Data
Sept. 12, 1973 Norway................................ 3554/73

[52] U.S. Cl............................... 141/360; 141/367; 251/339
[51] Int. Cl.²......................................... B65B 3/06
[58] Field of Search ............ 136/162; 137/260, 261, 137/453; 141/301, 307, 308, 309, 351–353, 360, 362, 364, 367, 368; 251/291, 293, 339; 222/309

[56] References Cited
UNITED STATES PATENTS

| | | | |
|---|---|---|---|
| 510,215 | 12/1893 | Vauzelle .......................... | 251/339 X |
| 923,611 | 6/1909 | Werd .............................. | 251/339 X |
| 1,672,983 | 6/1928 | Mapel ............................. | 141/308 X |
| 2,009,575 | 7/1935 | Card ............................... | 251/339 X |
| 3,420,281 | 1/1969 | Tidwell .......................... | 141/308 X |

FOREIGN PATENTS OR APPLICATIONS

| | | | |
|---|---|---|---|
| 130,062 | 5/1947 | Australia........................... | 141/308 |

*Primary Examiner*—Richard E. Aegerter
*Assistant Examiner*—Frederick R. Schmidt
*Attorney, Agent, or Firm*—Young & Thompson

[57] ABSTRACT

An automatic battery filler for adding distilled water to storage batteries, comprises an airtight closed water vessel with a spout having a discharge outlet. A spring-loaded valve has a valve stem that protrudes from the end of the spout. Means are provided to adjust the distance between the end of the valve stem and the outlet of the spout, thereby to predetermine the level at which the container will be supported on the battery by the valve stem when the valve is fully open, which in turn will predetermine the level to which the battery is filled. The adjustment is preferably effected by rotating a screw-threaded connection. The socket or the spout has a graduated scale which indicates the level to which the apparatus has been adjusted.

1 Claim, 2 Drawing Figures

AUTOMATIC BATTERY FILLER

The present invention relates to an automatic battery filler of the kind which is used for adding distilled water to lead accumulators. Such automatic battery fillers consist of an airtight closed water vessel with a spout. Inside the spout there is a spring-loaded valve with a valve stem jutting a bit out of the opening of the spout. When the spout is inserted into for instance a car battery to add water, the spout is placed against the top of the plates in the battery cell so that the valve stem is pressed in. Thereby the valve inside the spout opens, and water flows from the vessel into the cell, at the same time that air bubbles rise in the vessel. When the electrolyte level in the cell reaches the opening of the spout, which is resting on the top of the plates in the cell, the water stops flowing from the vessel owing to the air pressure. When the spout is taken up from the cell, the valve is closed again at the same time that the small amount of water in the spout itself, flows into the cell.

A great disadvantage of the known battery fillers of this kind is that one cannot choose electrolyte level in the cells, as this will automatically be at the level of the top of the plates in the cells.

The object of the present invention is to provide an automatic battery filler which can be adjusted to the electrolyte level wanted in the cells.

According to the invention the object is attained by the distance between the end of the valve stem and the outlet port of the spout when the valve is pressed in for full opening, being adjustable by means of for instance a socket screwed on the valve stem or on the spout.

Another feature of the present invention in the version where a socket is screwed on the valve stem, is that the socket merges into the spout so that the socket also serves as a valve guide. The socket is also formed with flow openings so that the water can flow through it, and with a longitudinal aperture so that the water can flow out through the lower part of the aperture that is not covered by the spout.

Another feature of the present invention in the version in which a socket is screwed on the spout, is that the lower part of the spout is formed with a longitudinal aperture, so that the water can flow out through the lower part of the aperture that is not covered by the socket.

Still another feature of the present invention is that the socket or spout is formed with a graduated scale which indicates the electrolyte level to which the battery filler is adjusted.

Two embodiments of the invention will now be described by way of example with reference to the accompanying drawing in which.

Figure 1:
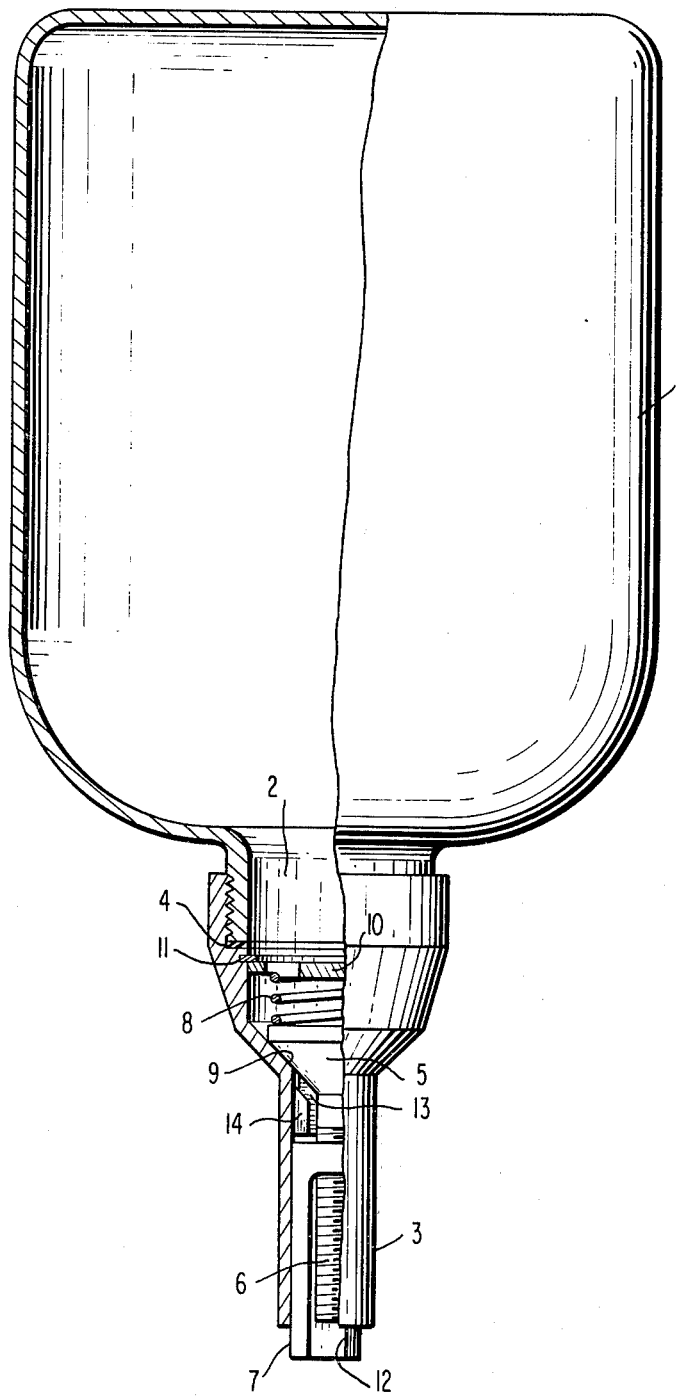
FIG. 1 shows half in section an automatic battery filler according to the invention and in the version in which a socket is screwed on the valve stem.

Referring now to the drawing in greater detail, FIG. 1 shows an airtight closed water vessel 1 with a filling opening 2. A spout 3 is screwed tight on the filling opening 2. A rubber packing 4 secures tight connection between water vessel 1 and spout 3. Inside the spout 3 is arranged a valve 5 which is formed with a valve stem 6. A socket 7 is screwed on the valve stem 6. A coil spring 8 retains the valve 5 at rest against valve seat 9 formed in the spout 3. The coil spring 8 rests against a perforated disc 10 which is retained in position by means of a holding ring 11. The socket 7 slides in the spout 3 so that the socket also serves as a valve guide. The socket 7 is formed with flow openings not shown in the drawing, so that the water can flow through it. The socket 7 is also formed with a longitudinal aperture 12 so that the water can flow out through the lower part of the aperture 12 that is not covered by the spout 3.

Depending upon how far the socket 7 is screwed out on the valve stem 6, a greater or lesser part of the socket 7 will jut out from the opening of the spout 3 when the valve 5 is pressed in for full opening, and on a graduated scale on the outside of the socket 7 one will be able to read off how high an electrolyte level the setting of the socket 7 will give.

To prevent the valve stem 6 from revolving when the socket 7 is screwed, the valve stem 6 is formed at its top with a number of lugs 13 arranged to cooperate with a corresponding number of lugs 14 on the inside of the spout 3.

Figure 2:
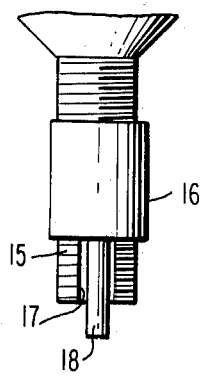
FIG. 2 shows the lower part of the spout of an automatic battery filler according to the invention and in the version in which a socket is screwed on the spout.

FIG. 2 shows the lower part 15 of a spout similar to the one shown in FIG. 1. A socket 16 is screwed on the spout 15 which is formed with a longitudinal aperture 17, so that the water can flow out through the lower part of the aperture 17 that is not covered by the socket 16. The valve stem 18 is in this embodiment also formed with lugs to serve as a valve stem guide, not shown in the drawing.

Depending upon how far the socket 16 is screwed in on the spout 15, a greater or lesser part of the aperture 17 will be uncovered, and on a graduated scale on the outside of the spout 15 one will be able to read off how high an electrolyte level the setting of the socket 16 will give.

In view of the foregoing disclosure, therefore, it will be evident that the initially recited object of the present invention has been achieved.

Although the present invention has been described and illustrated in connection with two preferred embodiments, it is of course to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. Automatic battery filler for adding distilled water to storage batteries, comprising an airtight closed water vessel with a spout having a discharge end remote from the vessel, a valve with a valve stem disposed in the spout and movable lengthwise relative to the spout, spring means acting on the valve to urge the valve toward a position in which the valve closes the spout, the valve stem being externally screw threaded, a socket slidable within the spout and surrounding and screw threadedly engaged with said valve stem, said socket having a lengthwise aperture therein, said socket having an end projecting from the end of the spout, and means to limit the movement of said valve stem when said socket is screwed onto said valve stem, whereby rotation of the socket on the stem will cause the socket to protrude from the spout different distances, thereby to adjust the level to which said storage battery is filled from the container when the container is positioned with the spout pointing down with the weight of said container resting on said socket and the projecting end of said socket is contacting said storage battery to open said valve.

* * * * *